March 29, 1955     M. ROGERS     2,704,894
ALIGNMENT GAUGE
Filed April 13, 1950     2 Sheets-Sheet 1
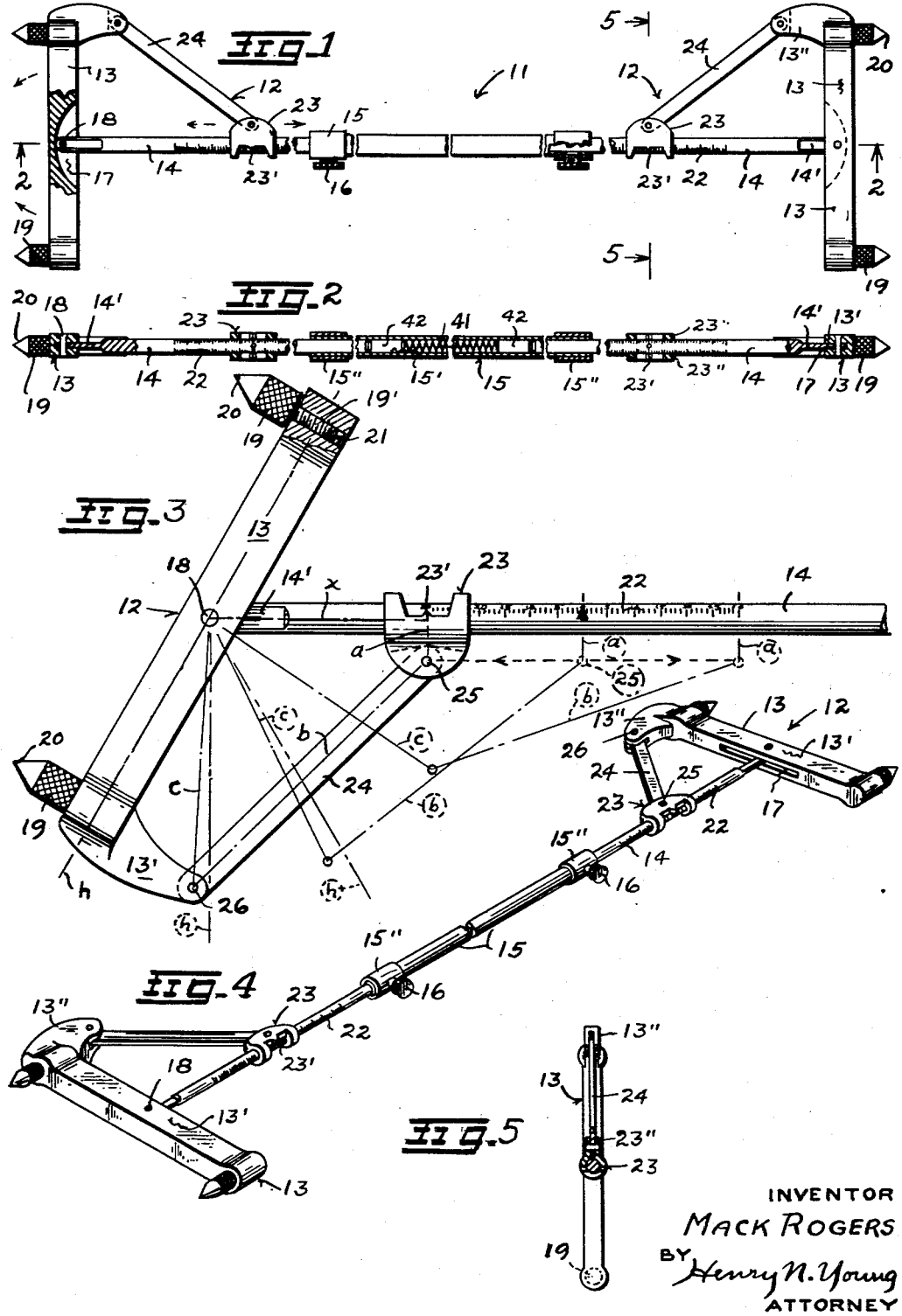
INVENTOR
MACK ROGERS
BY Henry N. Young
ATTORNEY March 29, 1955 M. ROGERS 2,704,894
ALIGNMENT GAUGE
Filed April 13, 1950 2 Sheets-Sheet 2
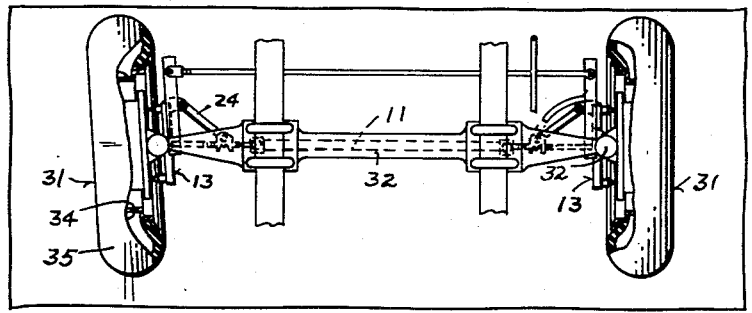
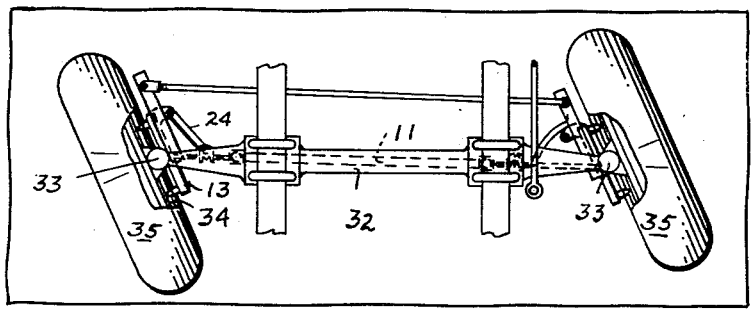
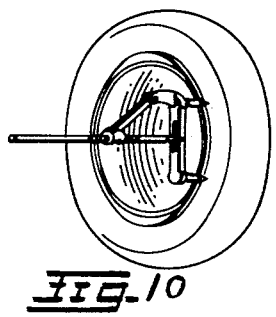
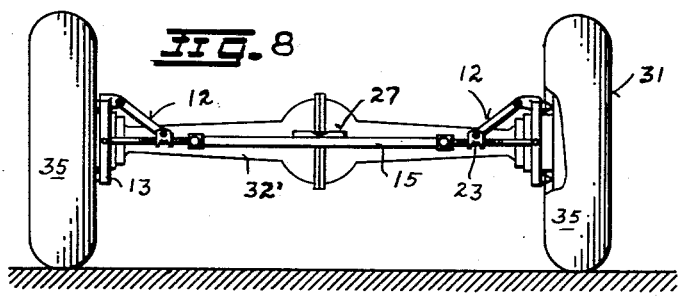
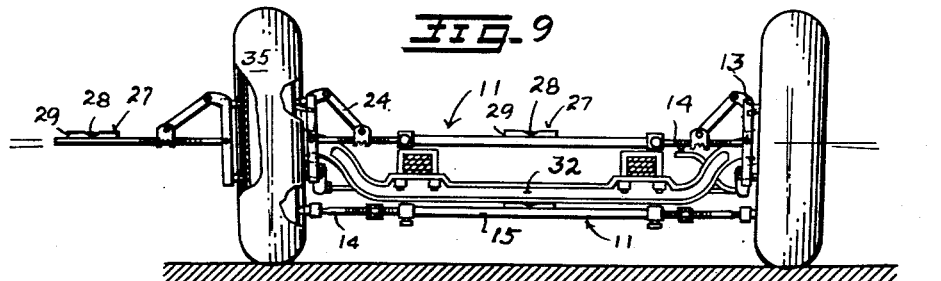
INVENTOR
MACK ROGERS
BY
Henry N. Young
ATTORNEY

United States Patent Office 2,704,894
Patented Mar. 29, 1955

2,704,894

ALIGNMENT GAUGE

Mack Rogers, Hayward, Calif.

Application April 13, 1950, Serial No. 155,583

2 Claims. (Cl. 33—203.2)

The invention relates to a device which is particularly adapted for gauging various alignment relations of dirigible support wheels of automobiles and other landborne vehicles.

A general object of the invention is to provide a device for measuring the angularity of more or less upright articles with respect to the horizontal.

Another object of the invention is to provide a generally improved gauging apparatus which is particularly adapted for gauging all the more important and usual alignment relations of vehicle wheels without requiring any floor-mounted equipment.

A more specific object is to provide a device of the character described which is particularly adapted for gauging vehicle running-gear relations such as the caster and camber and toe-in and turning radius of a wheel, and the mutual relations of the wheels to each other.

The invention possesses other objects and features of advantage, some of which, with the foregoing, will be set forth or be apparent in the following description of a typical embodiment of the invention, and in the accompanying drawings, in which:

Figure 1 is a side view of a unitary tool assembly embodying a gauging means of my invention, portions of the structure being broken away.

Figure 2 is a sectional view taken at the line 2—2 in Figure 1.

Figure 3 is an enlarged fragmentary and partly sectional view of an angle-measuring unit of the tool assembly of Figure 1.

Figure 4 is a perspective view of the assembly of Figure 1.

Figure 5 is a sectional view taken at the line 5—5 in Figure 1.

Figure 6 is a plan view showing the tool as operatively applied for gauging the toe-in relations of a pair of coaxial dirigible wheels of a vehicle.

Figure 7 is a plan view showing the tool as operatively applied for the gauging of the turning-radius of the vehicle wheels.

Figure 8 illustrates a gauging application of the tool with respect to a pair of fixedly related wheels supporting a common axle housing.

Figure 9 shows the tool as applied for gauging the camber and caster of a pair of dirigible wheels.

Figure 10 is a perspective view showing an application of the tool to the side of a wheel.

A present gauging tool 11 comprises an assembly including angle-measuring units 12 connected by a common spacing bar. A present unit 12 comprises a head bar 13 hinged to a stem 14, and the stems 14 of a pair of units 12 are arranged for use to mount the heads 13 of the units at the opposite ends of a common connecting member 15, whereby the stems 14 and member 15 may cooperatively provide a connecting and spacing bar for the heads.

Except for the portions thereof which are immediately adjacent the heads, the present stems 14 are of uniform circular cross-section for their telescopic and rotative insertion in a complementary axial bore 15' provided through the member 15, said member being tubular and being provided with exterior reinforcing collars 15" at its extremities. Set-screws 16 are mounted in the sides of the member 15 at the collars 15" for radially engaging the inserted stems of the units 12 to secure one or both the heads 13 in rotatively adjusted and adjustably fixed spaced relation with respect to the member 15 and each other.

As particularly shown, each head 13 has an intermediate portion of rectanular cross-section, and said portion is provided with a slot 17 extending into it from one edge for receiving a flattened end portion 14' of its associated stem 14 which is connected to the head by a hinge pin 18 mounted in the head and extending transversely through the head and stem end at the slot; the arrangement is essentially such that the head and stem are hingedly attached for their relative swinging in a common plane. Near its extremities, the head 13 is provided with members 19 fixed thereto and extending therefrom oppositely to the stem 14 and providing relatively sharp points 20 which are arranged to define the line of application of the head as a straight-edge to a workpiece, said line being parallel to a longitudinal head line $h$ which intersects the axis of the pin 18; the points 20 are preferably, but not essentially, equally spaced from the hinge pin 18. The present point-providing members 19 have reduced stem portions for threadedly and replaceably mounting them on the head, with the stem 19' of at least one member adjustably settable in the threaded receiving hole of the head by a set-screw 21 engaging its end as shown in Figure 3.

It will now be noted that the stem 14 of each head 13 is provided with an angle scale 22 along an intermediate stem portion which is arranged to be exposed when the stem is extended for use from the end of the connecting tube 15. An index member 23 is slidably mounted on said stem portion and is intermediately cut away at one side to provide a sight opening and a pointer 23' for reference to the angle scale 22, said scale being calibrated in opposite directions from an intermediate zero point thereof. A link 24 connects opposed radial ears 23" of the index member 23 with one end of the head 13 whereby a rocking of the head on the stem is arranged to shift the index along the angle scale 22 in accordance with the angular disposal of the line of the head points 20 with respect to the axis of the stem 14. The arrangement is essentially such that when the straight-edge line of the points 20 is perpendicular to the stem axis, the indicator point 23' of the member 23 registers with the zero of the scale 22, and when said line of the points is angularly related to the stem axis, the indicator point 23' directly indicates on the angle scale the angular displacement of the head from a zero setting for the indicator point 23'.

The present linkage between the head and the slidable index member 23 is preferably such that the angle scale 22 has the same spacing for its angle-indicating divisions for its entire length, and the present linkage has been designed to this end. As particularly brought out in Figure 3, the hinge-pin 25 providing the connection of the link 24 to the ears 23" of the member 23 is laterally offset from the axial line of the stem-receiving bore of the member by a fixed distance designated by the length of a line $a$, while the other end of the link 24 is hingedly connected to the head 13 at a transverse hinge-pin 26 provided in a rearward arm extension 13' of the head, the link 24 being of fixed length and having its length line designated as $b$.

The line of fixed length connecting the hinge pin 26 with the hinge pin 18 is designated by the letter $c$, and makes an angle of approximately twenty-eight degrees with the head line $h$, and a line $x$ extending from the hinge-pin 18 in the axial line of the stem 14 to the stem point at the positioned pointer 23' has a variable length in accordance with the positioning of said pointer. It is to be noted that the lines $a$ and $b$ and $c$ and $x$ define and comprise the sides of a quadrilateral in which the sides $a$ and $b$ and $c$ are of fixed length and in which the side $x$ is of variable length and has a fixed angular relation to the side $a$ opposite which the pointer 23' is positioned; in the present instance, the line $a$ is perpendicular to the stem axis, but it is to be understood that the pointer may be provided elsewhere along the member 23 with the line $a$ correspondingly oblique to the axial stem line $x$.

Noting that the line $c$ between the hinge-pins 18 and 26 of the head 13 is in fixed angular relation to the line of the gauging points 20 and the longitudinal line $h$ of the head, it will be understood that an angular adjustment of the head with respect to the stem will effect a corresponding movement of the member 23 along the stem for positioning the pointer opposite the appropriate angle point of the scale 22 to directly indicate the angle of adjustment of the head, measurements being taken inwardly or outwardly from the zero point of the scale in accordance with whether the included angle defined by the head line $h$ and the variable line segment $x$ which lies in the stem axis is increased or decreased, it being understood that the hinge-pin 25 at the member 23 is shifted along a path parallel to the stem axis as adjustments are made.

Understanding that the successive angle calibrations of the scale 22 on the stem are desirably spaced evenly therealong, it has been found that the length of the lines $a$ and $b$ and $c$ and $x$ should be substantially in the continued ratio of 6 to 46 to 38 to 53 when the pointer 23' registers with the zero of the scale 22; with such a constant length relation of the lines $a$ and $b$ and $c$, like opposite angular adjustments of the head 13 with respect to the stem are arranged to dispose the pointer 23' at like distances from the zero of the scale 22, the present scale being calibrated for up to thirty-degree angle adjustments of the head from its zero setting when the head is perpendicular to the stem. It is to be noted that the rearward offsetting of the hinge pin 26 with respect to the head line $h$ to provide for a uniform spacing of angle calibrations at the scale 22 also results in an appreciably greater spacing of the calibrations than if the hinging axis of the pin 26 were in the line $h$.

The present angle-measuring assemblies 12 and/or the connecting member 15 are arranged during the use thereof for disposition in certain angle-gauging positions by appropriate applications thereto of a free level unit 27 of a usual type which comprises a level bubble 28 fixedly enclosed in a suitable cylindrical housing 29 which is of uniform external cross-section to provide for its direct leveling disposal against and along a surface of a member to be levelled. To provide for the use of a level unit 27 therewith, each gauging-head member 13 has at least the central portions of its side faces 13" mutually parallel to each other and the plane of the slot, whereby the leveling of either face may effect a level disposal of the line of the head points 20 and of the longitudinal head line $h$. Except at the collars 15", the member 15 is of uniform exterior cross-section whereby a level unit 27 may be extended along this member for leveling it. It is also to be noted that the stems 14 of the gauging heads 13 may mount a level unit thereon for leveling them while the longitudinal line $h$ of the head is upright.

It will now be noted that a present gauging unit 12 is arranged for cooperative use with a level unit 27 for gauging, with respect to a vertical plane, the position of a work-piece line defined by a surface or a pair of points to which the unit points 20 may be simultaneously applied. When the head points 20 are applied for angle-gauging purposes, the leveling of the stem 14 by the use of a level unit 27 disposed on and above it will provide on the scale 22 an angle reading for indicating the angular position of the line of the points with respect to a vertical plane which is perpendicular to the stem axis. The unit may thus be used for directly measuring the angularity of a sloping line with respect to the vertical and/or setting an object in vertical position or in desired gauged angular relation to the vertical. Such a use of a gauging unit 12 is illustrated in Figure 9 wherein a unit is shown applied against the outside of a dirigible vehicle wheel 31, said wheel comprising one of a pair which carry a non-rotating axle 32 on spindles extending from king-pins 33 at the axle ends and constituting a work-piece with respect to the tool. It will be understood, however, that a present unit 12 is generally usable to advantage in the indicated manner in the building and other trades.

In operatively applying a present gauging head 13 to a wheel 31 comprising a disc providing a peripheral rim 34 which mounts a pneumatic tire 35, it is a usual practice to apply the points 20 to the tire sides while the sides of the members 19 which provide the points engage radially against the edge bead of the rim 34 which mounts the tire, this relation being brought out in Figures 6 and 10. Such an operative application of a head 13 to a wheel is facilitated by conically tapering the outer portions of the members 19 to provide the points 20 which are sharp enough for their indenting engagement with the tire when in sufficient pressure engagement therewith. It will be understood that the simultaneous engagement of the point and sides of a member 19 transversely against the tire and the periphery of the rim 34, respectively, is operative to steady the head in its applied position.

When the present device is to be utilized for ascertaining the angular relation of the central planes of wheels of a cooperative pair, the stems 14 of the units are telescopically engaged in the tube 15 from its different ends, with a helical compression spring 41 freely operative between the inner stem ends to urge a mutual separation of the stems. The arrangement is essentially such that the spring 41 may simultaneously urge a relative separation of the heads 13 when inserted between wheels 31 to press the head points 20 into the opposed tire sides with sufficient force to removably support and hold the assembly in fixed mounted relation to the different wheels and thereby facilitate reference to the angle indications of the pointers 23'.

Since, in practice, the mutual spacing, or tread of more or less coaxial vehicle wheels of a pair varies, and the effective action of the spring 41 decreases as its length increases, cylindrical members 42 of appropriate number and length are preferably provided for their slidable insertion in the tube bore 15' between the spring 41 and either or both of the opposed stem ends to, in effect, shorten the spring for a tool-mounting spacing of the heads 13 between a pair of wheels, and so provide an increased retaining pressure at the head points 20. The set-screws 16 are applied against the stems 14 for holding the heads 13 in unitary association with the tube 15 when the assembly is not in use and is longitudinally contracted, or when only one unit 12 is being used while attached to the tube. Also, if a unit 12 should be removed from the assembly for its separate use, a set-screw 16 may be projected against a member 42 for imprisoning the spring 41 between it and the set stem 14 of the remaining unit 12.

In using a present gauging assembly 11, the heads 13 are arranged to be disposed for gauging applications thereof when either horizontal or vertical whereby to obtain corresponding angle measurements at the scale 22 in horizontal or vertical planes in accordance with the required gauging operation. Figures 6 and 7 show a tool assembly 11 as applied to and between a pair of wheels 31, with the gauging assembly disposed below the axle 32 as permitted by the fact that the spacing of the head points 20 is appreciably less than the diameter of the periphery of the tire-mounting rim 34. Such an operative positioning of the assembly in offset relation to the wheel axes is readily effected, with the assembly actually supported on the tires at points thereof adjacent the rims 34 which carry them. In such an installation, the line of points 20 of each head is preferably disposed horizontally by applying a level unit 27 to the upper head face 13" longitudinally thereof for a leveling adjustment of each head while it is in supported engagement with a tire, correction being made by circumferentially shifting the points 20 along the tire or appropriately rotating the wheel if it is free for its rotative adjustment, such correction adjustments being permitted by reason of the relative rotatability of the heads about the axis of the stem-connecting tube 15.

Having the heads 13 horizontally disposed in engaged relation with the wheels, a straight-ahead setting of the wheels by the operation of the vehicle steering wheel acting through a usual steering rod 36 and steering arm 37 extending from the wheel spindle provides for a comparison of the angle settings of the wheels with respect to the longitudinal axis of the tube 15 for a determination of toe-in relations between the wheels, and any correction thereof which may be needed. The same mounting of an assembly 11 provides for a turning radius determination by turning the wheels to a predetermined measured turning angle for one of them, and comparing the corresponding turning angle of the other wheel with that of the first, the wheels then being in a relative toe-out relation and the difference in the turn angles being comparable with a tabulation (not shown) of preferred figures of such differences, said tabulation being based on the length of wheel base of the vehicle and the predetermined angle of setting of the first wheel, the latter angle usually being twenty degrees. Particularly for this type of gauging use, the permitted relative rotatability of the heads 12 of a mounted tool about the common stem line is necessary by reason of the effects of camber and caster on the disposal of the heads as the supporting wheels are turned.

Figure 8 shows a tool assembly 11 mounted between the rear non-dirigible wheels 31' of a vehicle, the axles of said wheels being journalled in a usual axle housing 32'. With the heads 13 in horizontal position, and the tube 15 and the heads leveled, the readings on the scales 22 will indicate whether the wheels are mutually parallel in a fore and aft direction and are perpendicular to the axis of the axle housing 32'. When the heads 13 engage the wheels 31' in upright position while the tube 15 is level, the readings on the scale 22 will indicate whether the wheels are perpendicular to their common line of support. In such gaugings of the rear wheels 31', it will be understood that zero readings will be provided on the scales 22 unless the axle housing has been sprung in the direction indicated by an off-zero reading. As previously noted, the present application of an angle-measuring unit 12 represents an application of the unit to gauging the perpendicularity of points having an upright connecting line.

Recalling that the camber of a dirigible wheel is independent of the camber of a cooperating wheel, Figure 9 discloses the angle-measuring application of a unit 12 against the outside of a wheel 31. When the wheel is set in straight-ahead position with respect to the supported vehicle, and the stem 14 of the unit 12 leveled, as by the use of a level unit 27, a reading on the scale 22 directly indicates the camber angle of the wheel. While an angle unit 12 may thus be used independently at the different wheels 31 for measuring the camber thereof, the angle units 12 of a complete assembly 11 may be utilized for camber measurements by installing the assembly 12 to have its heads 13 in upright position, as is also shown in Figure 9, such an application of an assembly 11 being also utilized for gauging the off-vertical angularity of the king-pin which determines the caster action of the wheels.

Having an assembly 11 mounted with its heads upright on and between a cooperative pair of dirigible wheels 31, the caster of the king-pins 32 for the wheel spindles may be individually determined by the disposal of each wheel in predetermined right-turn and left-turn positions (usually 20 degrees) to give readings which are jointly interpretable as measuring the caster of the king-pins by reason of the effect of their caster on the number of a given wheel. The gauged turning of the wheels to provide camber readings for use in caster determinations may be effected by the use of any available means for the purpose; as particularly indicated in Figure 9, a second tool unit may be mounted between the wheels with its heads 13 level for providing the desired angle measurements. It will be understood that such a use of a pair of assemblies 11 for caster determinations eliminates any need for the provision of supporting turn-tables or other special devices for the measurement of turn angles, and thus permits the gauging of alignment relations of dirigible wheels which are directly supporting a vehicle on any horizontal support surface.

Noting that the described uses of the present gauge with a cooperative pair of vehicle-supporting wheels assume the disposal of wheels of like diameter on a level line of support, the appropriate test-positioning corrections must be made if the wheels are of unlike diameter or the line of support is not level. Thus, if pneumatic-tired wheels are of unlike diameter, the wheel of greater diameter may be appropriately deflated. Furthermore, if the line of support is not level, the lower wheel may be appropriately blocked up. While such is not shown, the wheels of a dirigible pair to be gauged may rest upon free turntables or upon greased floor portions for facilitating their turning during a gauging use of the tool.

From the foregoing description taken in connection with the accompanying drawings, the advantages of the present wheel alignment gauge will be readily understood by those skilled in the art to which the invention appertains. While I have described a structural combination and the principles of operation and use of an angle-gauging tool which I now consider to be a preferred embodiment of my invention, I desire to have it understood that the showings are primarily illustrative, and that such changes and developments may be made, when desired, as fall within the scope of the following claims.

I claim:

1. A tool for gauging the relative angularity with respect to the vertical of a cooperative pair of dirigible vehicle-supporting wheels, heads having straight-edge sides arranged for simultaneous engagement with the mutually opposed sides of the wheels in parallel relation to the wheel planes, straight stems extending from corresponding points of said heads in hinged relation thereto and in mutual alignment for a relative swinging adjustment of the heads and stems through perpendicular relations thereof in planes transverse to the wheel planes, each said stem being provided with angle scale calibrations therealong in a line parallel to its longitudinal axis and extending from an intermediate zero point thereof, index members slidable on said stems solely axially thereof and providing pointers having reference to said scales and registering with the zero point of the scales when the heads and stems are mutually perpendicular, links connecting associated said heads and members in such relation thereto that a given angle change from any initial head and stem relation is directly gauged by a corresponding movement of the index pointer along the scale for the scale distance corresponding to the scale change, and a connecting member coaxially and independently engaging the aligned stems in relatively rotatable relation to them.

2. In a wheel alignment gauge of the character described, an elongated gauging head providing a straight edge for application to a reference surface provided by a wheel side, a straight stem hinged to said head centrally of its length for a relative swinging adjustment of the head and stem through a right angle relation thereof and in a common plane transverse to said reference surface and provided with a scale therealong having angle calibrations spaced along it in opposite directions from an intermediate zero point thereof, a tubular index member complementarily and slidably receiving said stem and providing a pointer having reference to said scale, and a link connecting said index member to such a part of said head spaced from its hinging point and offset laterally from its straightedge at the index member side thereof whereby a given angular change from any initial head and stem relation is directly gauged by a corresponding movement of the index pointer along the scale for the scale distance corresponding to the angle change.

References Cited in the file of this patent

UNITED STATES PATENTS

| Number | Name | Date |
| --- | --- | --- |
| 390,705 | Quayle | Oct. 9, 1888 |
| 678,005 | Myers | July 9, 1901 |
| 746,384 | Roy | Dec. 8, 1903 |
| 1,206,476 | Snyder | Nov. 28, 1916 |
| 1,440,067 | Duby | Dec. 26, 1922 |
| 1,516,549 | Sandbo | Nov. 25, 1924 |
| 1,777,686 | Bagge | Oct. 7, 1930 |
| 2,110,636 | Sharp | Mar. 8, 1938 |
| 2,144,604 | Berger | Jan. 24, 1939 |
| 2,382,618 | Douglass | Aug. 14, 1945 |
| 2,509,466 | Leach | May 30, 1950 |
| 2,522,916 | Zeigler | Sept. 19, 1950 |

FOREIGN PATENTS

| Number | Country | Date |
| --- | --- | --- |
| 120,954 | Great Britain | Nov. 25, 1918 |
| 129,026 | Switzerland | Mar. 23, 1928 |